United States Patent [19]

DeFrank

[11] 4,131,590

[45] Dec. 26, 1978

[54] EPOXY-RUBBER BASED FRICTION MATERIAL

[75] Inventor: Michael P. DeFrank, Crawfordsville, Ind.

[73] Assignee: Raybestos-Manhattan, Inc., Trumbull, Conn.

[21] Appl. No.: 825,685

[22] Filed: Aug. 18, 1977

[51] Int. Cl.$^2$ .............................................. C08L 63/00
[52] U.S. Cl. ............................. 260/37 EP; 260/42.28; 428/413
[58] Field of Search ............... 260/37 EP, 42.28, 830; 264/153; 428/413

[56] References Cited

U.S. PATENT DOCUMENTS

| | | | |
|---|---|---|---|
| 2,947,338 | 8/1960 | Reid et al. | 260/42.28 X |
| 3,655,818 | 4/1972 | McKown | 260/37 EP X |
| 3,686,359 | 8/1972 | Soldatos et al. | 260/37 EP X |
| 3,801,406 | 4/1974 | Debenedetti | 264/153 X |
| 3,948,849 | 4/1976 | Barie | 260/37 EP |
| 4,025,578 | 5/1977 | Siebert | 260/42.28 X |

*Primary Examiner*—Lewis T. Jacobs
*Attorney, Agent, or Firm*—Gary, Juettner & Pyle

[57] ABSTRACT

A superior friction material having high mechanical fatigue resistance and a stable dynamic coefficient of friction over a wide temperature range is prepared from an intimate mixture of an epoxy-rubber binder and friction modifying materials. The material is formed by mixing the uncured epoxy resin with the rubber and friction modifying materials, forming the mixture into the desired shape while soft and pliable, and then heat curing the mixture.

9 Claims, No Drawings

EPOXY-RUBBER BASED FRICTION MATERIAL

BACKGROUND OF THE INVENTION

This invention relates to composite friction materials that exhibit high mechanical fatigue resistance and a stable coefficient of friction over a wide temperature range.

Various materials containing elastomers have been proposed for use as friction materials, for the purpose of increasing the resiliency of the composite material. Such property would be particularly desirable for use in heavy duty clutch and transmission applications, which are especially subject to high wear, deterioration and fatigue upon repeated engagement between the friction material and the mating member. Wear and fatigue conditions are particularly exaggerated when the friction material cannot accommodate high spots on the mating member.

It would also be desirable to provide a friction material having excellent characteristics that could be produced and formed into the desired shape without the use of sophisticated or expensive machinery and processing methods. Many friction compositions are stiff or inflexible and require precision molding or other special production techniques.

Heretofore, the foregoing criteria have not been adequately met by a single type of friction material. Generally, materials that are easily fabricated exhibit poor performance, especially in heavy duty applications. Other materials considered suitable for heavy duty friction requirements are difficult or costly to produce or fabricate.

As examples of the foregoing, in order to obtain a stable coefficient of friction over a wide temperature range, industry has resorted to the use of inorganic friction materials such as sintered bronze. The production of these materials, however, requires the use of heavy presses and other costly equipment and processing common to powder metallurgy. Also, the resulting material has a high modulus and tends to fatigue and erode under heavy loads, due in many cases to the inability to conform to the mating member.

Various friction compositions containing rubber and a phenol-formaldehyde resin have been proposed, as illustrated in U.S. Pat. Nos. 2,149,483, 2,599,826, 2,686,140, 2,910,449, 3,152,099, 3,344,094, 3,365,041 and 3,673,276. Generally, these materials have been found to deteriorate under high peak and bulk temperature conditions created by the sustained or heavy loading forces experienced while under operating conditions. As a result of this decomposition, the physical properties of the material undergo undesirable change and require replacement.

A recent improvement described in U.S. Pat. No. 3,898,361 is the use of a fluroelastomer as a binder in a friction material. Although the resultant material exhibits very good physical properties, the method of manufacture requires costly high pressure precision molding, and the basic material utilized is expensive.

SUMMARY OF THE INVENTION

The present invention provides a friction material having excellent mechanical and fatigue properties and a stable coefficient of friction over a wide temperature range, said material requiring simple and inexpensive methods for fabrication and shaping.

The friction material of this invention is characterized by a blend of epoxy resin and a nitrile rubber. Also included within the mixture are friction fillers to impart the desired friction characteristics. The blend is initially uncured and in such conditions is sufficiently flexible to allow simple formation of a large variety of shapes and sizes of friction elements. The mixture is then cured, thereby substantially increasing the toughness, strength and wear qualities of the material, with the binder forming a temperature stable matrix for the filler while retaining proper modulus necessary for accommodating high spots in the mating member against which the friction member is engaged. The friction member, after being formed into the desired shape and while uncured, may be adhered to a relatively rigid backing member and then cured to obtain a finished product.

DESCRIPTION OF THE PREFERRED EMBODIMENT

The present invention provides a friction material characterized by a novel flexible binder system composed of an intimate blend of an epoxy resin and a high temperature resistant rubber. The epoxy is cured with a conventional curing agent in the presence of the rubber after the blending has taken place. Many types of synthetic rubbers useful in high temperature environments are chemically reactive with epoxy resins or with the curing agent used therewith. If an epoxy-reactive rubber is used, copolymerization occurs, and it has been found that the resultant properties of the material as a binder for friction materials are much better than would be expected or obtained from the properties of either material when used alone.

In the preferred embodiment, the rubber utilized is selected from those which are fairly stable at high temperatures, i.e. temperatures in excess of 225° to 300° F., and which are potentially reactive during cure of the epoxy-rubber system being utilized. Synthetic rubbers potentially directly reactive with the epoxy resins contain methylol, hydroxyl, carboxyl, anhydride, nitrile, or thiol group.

Of the commercial available rubbers that are potentially reactive with epoxy resins, nitrile elastomers are preferred, especially those having a medium to high acrylonitrile content. Particularly advantageous are nitrile rubbers containing a significant quantity of carboxy groups. Such elastomers, which are nitrile rubbers that are partially carboxylated, are referred to as carboxy modified nitriles and are sold, for example, by the Goodrich Chemical Company under the name "Hycar 1072" and by the International Latex Corporation under the names "Tylac 212A-HV and 211A, LV, HV." These rubbers are typically furnished as slabs and may be milled to particulate or granular form to facilitate blending and processing.

The epoxy resin employed is preferably a diglycidyl ether of bisphenol A having an n valve of greater than zero and less than one. The types most preferred are selected to have a high thermal stability and are a viscous liquid in an uncured state, preferably a viscosity above 1,000 poise. The uncured epoxy also preferably contains an effective amount of a curing agent, the mixture being stable at room temperature for ease of processing and curable at a temperature above room temperature, preferably above 250° F. Conventional curing agents include Lewis bases, inorganic bases, primary and secondary amines, and amides. Suitable epoxies include viscous adhesive grades containing, for example, dicyandiamide as a curing agent.

The uncured composition is formulated to contain from about 5 to about 40 percent epoxy resin, from about 5 to about 40 percent rubber, and the remainder as fibrous and/or powdered friction fillers to serve as friction modifiers. A wide range of binder compositions and various fillers and mixtures thereof may be employed, depending upon the properties desired. Typical fibrous fillers include inorganic and organic fibers such as glass, carbon, asbestos, wollastonite, cotton, heat resistant synthetic organic fibers and mixtures thereof. Typical powdered fillers include molybendinum disulfide, silica, petroleum coke, graphite, fluoropolymers, talc, cashew particles, powdered metals, various other forms of carbon, various other organic and inorganic powders, as well as proprietary mixtures such as "Molykote" friction particles.

In order to prepare a shaped article, the various materials employed are first blended together into a formable mass. The various ingredients may be placed as a batch in to a Banbury or Sigma blade mixer with mechanical pressure applied as required to obtain a uniform mixture. Preferably, the mixture is sufficiently soft to assure thorough blending, and if solid epoxy resin is used, suitable solvents for the epoxy may be utilized, or a relatively dry mixture can be prepared.

At the conclusion of blending, the mixture is preferably sufficiently pliable to be easily calendered, molded, cut, or otherwise formed or shaped. A convenient method for forming flat friction articles, such as discs, rings and the like, is to roll the material into the form of a sheet of the desired thickness. The sheet may then be cut with simple cutting tools into the desired shape, with any trim being saved for reprocessing.

The formed material may then be cured by application of heat at or above the curing temperature of the particular epoxy resin-rubber system and curing agent being employed. Preferably, however, the formed material is first adhered with a thermoset adhesive to its supporting member or core and then cured under pressure, whereby the friction material and adhesive is cured simultaneously. If desired, the cured friction surface may be ground or otherwise abraded to produce a desired groove pattern and to remove any surface irregularities or finish.

The cured product is highly wear resistant to an extent heretofore unavailable with easily processed materials and mixtures, and yet the material is sufficiently resilient to conform to surface irregularities of the mating member of a friction mechanism. The friction material exhibits a high, stable, dynamic coefficient of friction through a wide range of sliding speeds and normal loads against a wide variety of opposing faces and finishes.

The following examples are provided to further illustrate specific friction materials and properties thereof without limiting the invention in any manner.

EXAMPLE I

Various combinations of the following components were blended in a Sigma blade mixer, sheeted, cut into flat rings, applied with an adhesive to a steel backing member and cured at about 375° F.

| Ingredient | Amount-Weight Percent | |
|---|---|---|
| | Samples A | Samples B |
| Armstrong A-702 Epoxy (Liquid) | 5–30 | |
| Armstrong E-31000-4N Epoxy (Solid) | | 5–30 |
| Ferro 657 fiberglass | 10–30 | 10–30 |
| Molybendinum disulfide | 5–30 | 5–30 |
| Silica | 2–20 | 2–20 |
| Petroleum Coke | 5–30 | 5–30 |
| Rubber (HYCAR 1072) | 5–30 | 5–30 |
| Cashew Friction Particles | 2–15 | 2–15 |

EXAMPLE II

A summary of physical tests run on a typical composition of Example I may be summarized as follows:
1. Energy capacity greater than 3.2 horsepower per square inch.
2. Heat capacity greater than 1.2 BTU/in$^2$.
3. Resiliency up to a minimum of 20% at 5000 feet per minute.
4. Thermal stability up to 700° F.
5. Dynamic coefficient of friction in oil from 0.060 to 0.150.
6. Static coefficient of friction in oil from 0.100 to 0.300.

The above properties were determined by a typical power shift transmission test as follows:
  3rd Rev — 1st forward shift
  18,000 FPM linear speed
  0.50 sec. engagement time
  0.8 BTU/in$^2$
  3.2 HP/in$^2$ peak
  0.130 minimum dynamic friction
  0.012 gal/min/in$^2$ oil flow
  0.0025 inch total pack wear per face of friction material after 4,000 cycles.

I claim:
1. A friction material comprising a flexible solid binder matrix composed of a cured blend of epoxy resin and rubber, said material containing from about 5 to about 30 percent epoxy resin, from about 5 to about 30 percent rubber, and from about 60 to about 90 percent friction fillers comprising fibrous and powdered friction modifying materials, said friction material having a dynamic coefficient of friction in oil of from about 0.060 to about 0.150 and a static coefficient of friction in oil of from about 0.100 to about 0.300.
2. The friction material of claim 1 wherein said rubber is a carboxy modified nitrile rubber.
3. The friction material of claim 1 wherein said blend contains a copolymer of said epoxy and rubber.
4. The friction material of claim 1 further comprising a rigid support, said friction material being bonded to said support.
5. A friction material comprising a flexible solid matrix comprising friction modifying materials and a cured blend of epoxy resin and rubber, said friction material containing from about 5 to about 30 percent epoxy resin, from about 5 to about 30 percent rubber, and the remainder as friction modifying materials, said material having a dynamic coefficient of friction in oil of at least 0.060 and a static coefficient of friction in oil of at least 0.100.
6. A method of preparing a friction material comprising the steps of preparing a curable binder containing epoxy resin and rubber to form a pliable mass, mixing into said pliable mass sufficient friction modifying mate- rials to impart a dynamic coefficient of friction in oil of at least 0.060 and a static coefficient friction in oil of at least 0.100, forming the mixture of the binder and friction modifying materials into a sheet, cutting the sheet to a desired shape, and then curing the mixture.

7. The method of claim 6 wherein the epoxy is a diglycidyl ether of bisphenol A and the rubber is a carboxy modified nitrile rubber.

8. The method of claim 6 wherein the rubber and epoxy are each present in the composition in the amount of from about 5 to about 40 percent.

9. The method of claim 6 comprising the further step of bonding one side of said shaped material to a rigid support.

* * * * *